United States Patent Office 3,538,674
Patented Nov. 10, 1970

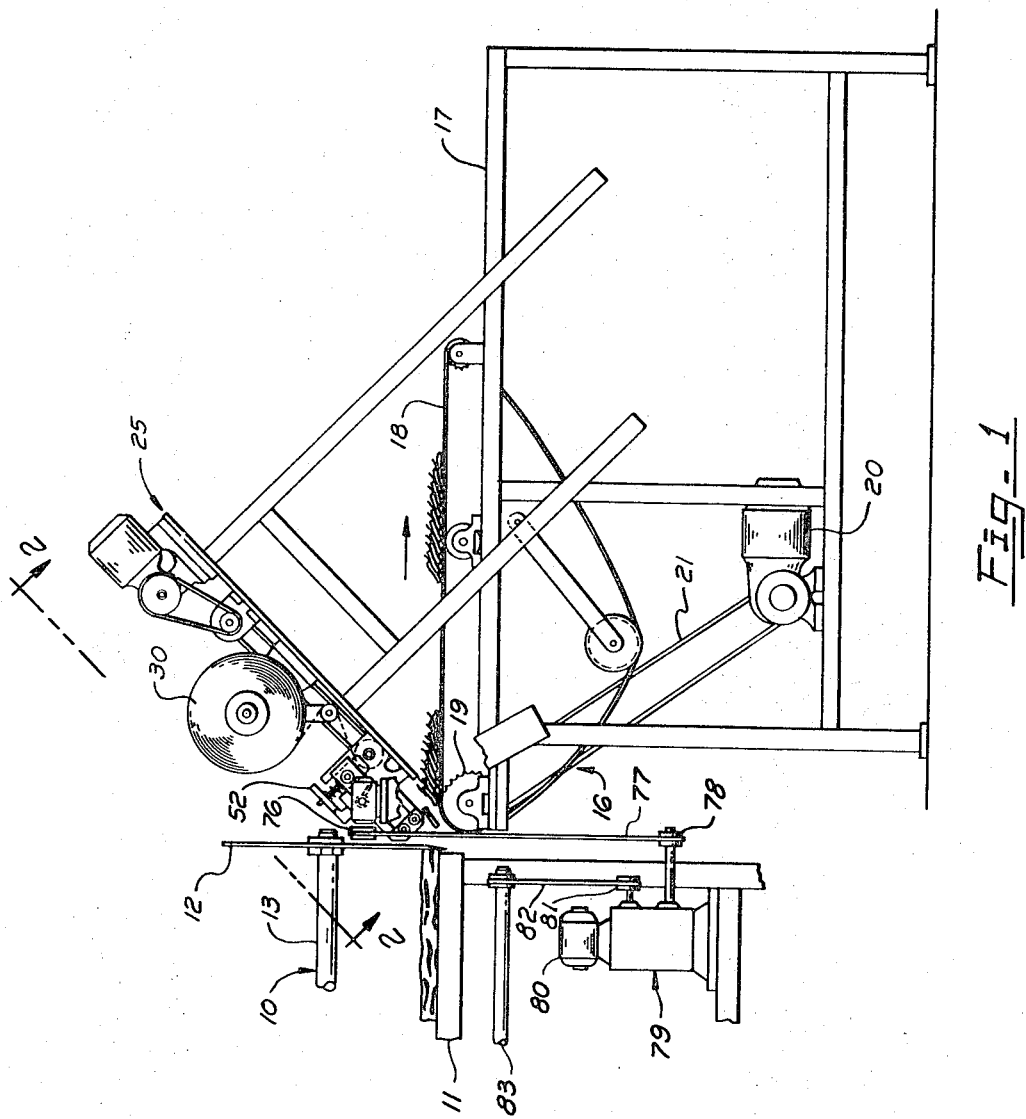

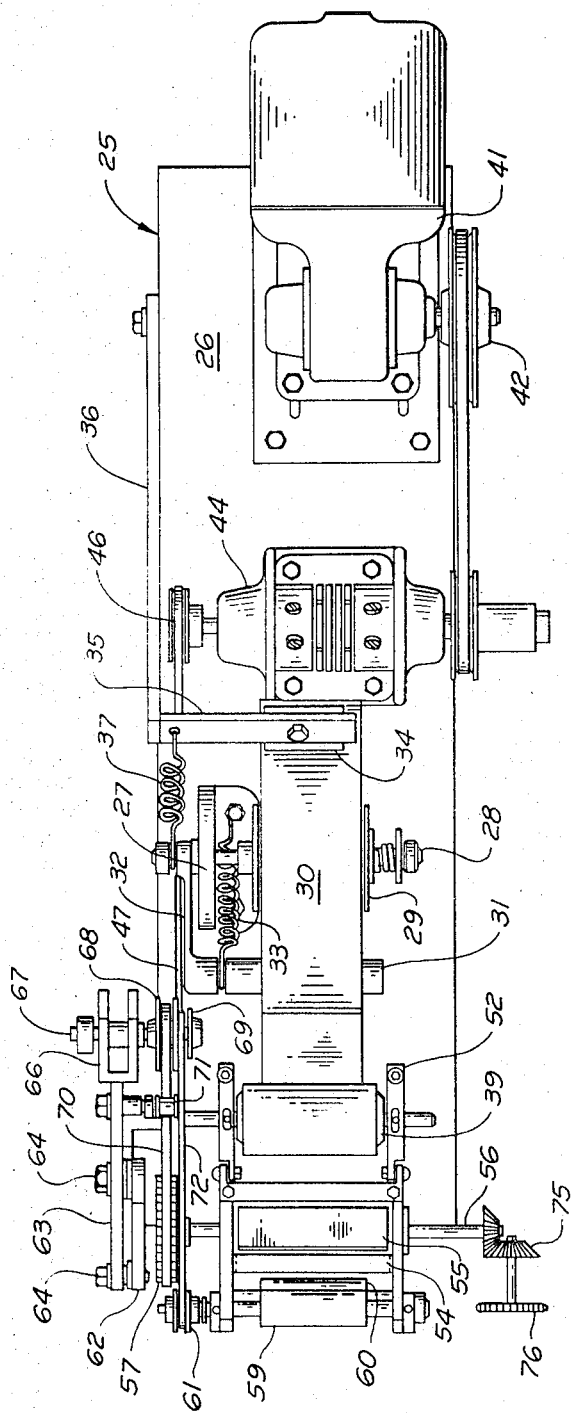

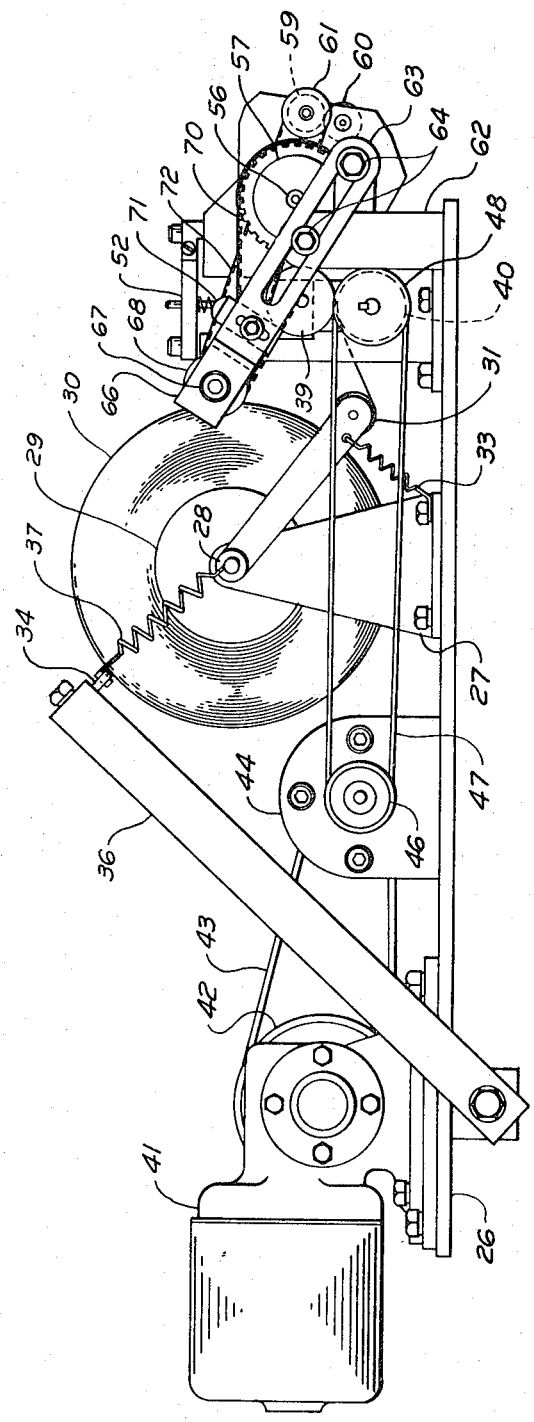

3,538,674
INTERLEAVING OF FOOD SLICES
Ogden A. Clemens, Chicago, Thomas R. Schreuder, South Holland, and Mitchell W. Panek, Chicago, Ill., assignors to Swift & Company, Chicago, Ill., a corporation of Delaware
Original application Oct. 25, 1966, Ser. No. 589,349, now Patent No. 3,481,746, dated Dec. 2, 1969. Divided and this application Aug. 18, 1969, Ser. No. 850,824
Int. Cl. B65b 61/22, 63/00
U.S. Cl. 53—123                                                 7 Claims

ABSTRACT OF THE DISCLOSURE

An improved apparatus is herein disclosed for interleaving of food materials sliced at high speed wherein said food material is sliced and thrown forwardly in a given path, said improved method comprising cutting an interleaf, and ejecting said interleaf in a downwardly direction to intersect said path in timed sequence to contact the forward face of a slice just after it is severed. Said disclosed apparatus comprises a slicing means for severing a succession of slices from a body of food product and throwing said slices in a forwardly path, a cutting means for severing interleaves being located forwardly of the slicing means and an ejecting means to accelerate each interleaf into the path of said slice leaving said slicing means.

This is a division of application Ser. No. 589,349, filed Oct. 25, 1966, now Pat. No. 3,481,746.

This invention relates to an improved apparatus for interleaving sliced product; and more specifically the present invention is an improved method and apparatus for placing separate interleaves between slices just after the slicing operation of product such as bacon.

Because many sliced products are difficult to handle and sometimes tend to cohere, it is often desirable to place a piece of dissimilar material between adjacent slices so as to facilitate subsequent separation thereof. The practice is widespread and is often utilized with confectionary, bakery products, and sometimes sliced cheese. The pieces of dissimilar material are usually known as interleaves or divider members. The interleaves may equal the slices, that is be placed between each two slices, or they may be placed between every second and third or fifth and sixth, etc. slices, whichever provides convenience for the ultimate consumer.

In the past interleaves have been placed between items of product relatively slowly by both hand and machine operations. It has also been proposed to weave a continuous web of interleaving material between slices by folding such material in alternate directions as successive slices are deposited on a stack. It has also been proposed that a continuous web of interleaving material could be pre-folded and inserted into soft food as a part of subdividing operation. Finally, it has recently been proposed to lay a web of interleaving material across the face of product as the latter is cut, and to sever the interleaving material into separate pieces by the same cutting operation.

However, to our knowledge, the prior practices have been adaptable only to relatively slow procedures not exceeding approximately 200–300 units per minute. One product for which interleaving has been proposed but heretofore not successfully mechanized, is sliced bacon. With that product speed assumes great importance as bacon slicing machines are capable of operating at speeds approaching 1,400 slices per minute; and do in fact operate at about that rate for brief periods while an entire slab or side of bacon belly is sliced and before the machine is reloaded with a fresh bacon belly. It will be apparent to those skilled in the art that the problems for mechanically inserting interleaves between every slice or every second or third slice at such speeds is quite complex and difficult.

Accordingly, it is a principal object of the present invention to provide an apparatus for placing individual interleaves between adjacent slices at high speed.

Another object of the present invention is to provide an apparatus for positioning interleaves at high speed between slices as the latter are produced from a slicing operation.

It is a further object of the present invention to provide an apparatus for interleaving bacon as it is sliced and shingled.

Basically the present invention contemplates a method as an adjunct to a bacon slicing and shingling operation wherein a bacon belly is advanced into a rotating slicing blade and the slices are severed therefrom and literally thrown across a short gap onto a take-off conveyor. The take-off conveyor is continuously moving away from the slicer so as to receive successive slices in shingled configuration. The interleaving of such slices is accomplished by cutting each interleaf, as required, from a continuous supply of interleaf material, and ejecting the severed interleaf in a downward direction to intersect the path of a slice being thrown from the blade across the aforementioned gap to the take-off conveyor. Preferably the interleaves are severed from a continuously moving web of material, the speed of which is adjustable so as to provide each interleaf with a dimension compatible with the width of each slice (the latter being the thickness of the bacon slab).

An apparatus for performing this method will comprise, in addition to the product slicing means and the take-off conveying means, a substantially continuous supply of interleaf material, an interleaf cutting means connected to be continuously driven in synchronism with the product slicing means, and an ejecting means positioned between the interleaf cutting means and the gap between the slicer means and take-off conveyor means, the ejector means operating to accelerate each interleaf along a direction aimed to intersect with the path of product slices before they are received on the take-off conveyor means.

Further objects and advantages of the present invention will become clear from the following description of the invention taken in conjunction with the drawings wherein:

FIG. 1 is a side elevatoin view of the invention in combination with a bacon slicer and take-off conveyor;

FIG. 2 is a plan view of a portion of the apparatus of FIG. 1 taken at line 2—2 in FIG. 1; and FIG. 3 is a side elevation view of the apparatus shown in FIG. 2.

Considering the present invention in greater detail as applied to interleaving bacon slices, it has been mentioned that when such slices are severed from a slab of bacon, at high speed, they are literally thrown by the slicer knife in substantially upright position across a short gap between the slicer apparatus and a take-off conveyor. The latter can be operated at a desired speed to produce a desired layout or shingle of the slices. According to the present invention, the individual interleaves are literally placed in the path of an individual bacon slice as it is thrown from the slicer blade. That is to say, as a slice is thrown forwardly its path is intersected by an interleaf so that the interleaf strikes and adheres to the forward surface of the slice and is carried thereby forwardly onto the rear surface of the preceding slice shingled out on the take-off conveyor.

Preferably, each interleaf is aimed and ejected so as to intersect the path of the slices along the end last severed from the bacon slab. That is to say, the rotating knife passes through the bacon slab from one side to another and thus the first severed end is first thrown toward the take-off conveyor immediately followed by the remainder of the slice as the knife severs the opposite and last end of the slice from the slab. It is at the latter end that the interleaf is to be placed and desirably with a small amount of the interleaf extending beyond the end of the slice.

Also, it is necessary, to accommodate the speed of the slicer, to cut each interleaf from a continuously moving web of interleaving material. The latter may be any one of many suitable materials such as parchment, cellophane, glassine, polyethylene, styrene, etc. The interleaving material should exhibit a stiffness sufficient to resist deformation or bending of individual interleaves by air currents during ejection. The speed of the interleaving material is regulated independently of the cutting thereof and coordinated with operation of the slicer so as to provide individual interleaves of a width (or height or vertical dimension) compatible with the similar dimension of the slices. Usually this is something slightly less than the similar slice dimension. Also, the interleaves may be substantially shorter in length than the slices since it is only necessary, from the standpoint of the consumer, to assist the beginning of separation of slices from one end thereof.

Both the feeding and cutting of interleaf material must be coordinated with the slicing of product such as bacon. Accordingly, an interleaf must be cut for every slice, or every second or third or fourth slice as desired, and in the interval between the cutting of interleaves the material must be advanced an appropriate distance as above discussed. In addition, it is very important that immediately after being cut each interleaf is immediately accelerated to a much faster speed and then ejected into the path of a slice.

One embodiment of an apparatus for performing this method is shown in the drawings. Viewing FIG. 1 a bacon slicer is shown generally at 10. The slicer includes a bed 11 and rotatable knife 12. The latter is mounted upon a rotatable knife shaft 13 powered by a motor and gearing not shown. A take-off conveyor generally 16 is provided beyond the blade 12 and comprises a table 17 and an endless conveyor 18 trained thereacross. The endless conveyor 18 is trained about a porcupine roll 19 closely adjacent and approximately parallel the plane of rotation of knife 12. A short distance separates the knife and porcupine roll. A motor 20 is connected to drive the porcupine roll 19 and endless conveyor 18 through a drive chain 21 so as to propel the upper run of the conveyor across table 17 away from the knife 12.

The interleaving apparatus generally 25 is shown positioned at an incline extending above and away from the gap between knife 12 and porcupine roll 19, in FIG. 1. Details of the interleaver 25 may be better seen in FIGS. 2 and 3. The interleaver apparatus is supported upon an inclined frame 26. Centrally located on the frame 26 is a stanchion 27 in which a shaft 28 is journaled. The latter rotatably supports a spool 29 of interleaving material 30. The spool feeds counterclockwise as viewed in FIG. 1 (clockwise as viewed in FIG. 3) and an idler roll 31 is provided to guide the interleaving material 30 as it leaves the spool 29. The idler roll is freely rotatable on an arm 32 pivoted from the spool shaft 28 and biased downwardly toward frame 26 by a tension spring 33.

The supply of interleaving material is also provided with a braking means to assure proper tension on the interleaving material. A brake pad 34 is pressed against the outer convolution of interleaving material 30 by means of a mounting bar 35 that is secured to an arm 36 pivoted beneath the frame 26 and biased downwardly by another tension spring 37.

The interleaving material 30 is continuously drawn from spool 29 by means of a pair of power driven feed rolls 39, 40 that are mounted beyond the idler roll 31 toward the slicer generally 10. The feed rolls are driven from an electric motor and variable speed drive 41 that is mounted at the opposite end of the frame 26 beyond the spool 29. An output drive pulley 42 on the latter is connected by a drive belt 43 with an electric clutch-brake unit 44. The clutch-brake 44 is thence connected by its pulley 46 and a drive belt 47 to a pulley 48 connected to the lower feed roll 40.

In operation the clutch portion electric clutch-brake is normally engaged (and the brake portion disengaged) so as to drive the feed rolls 39, 40 while the slicer feed mechanism (not shown) is advancing a bacon slab into the path of knife 12. When the slicer feed is halted an electrical circuit (not shown) is effected so as to disengage the clutch portion and engage the brake portion to simultaneously halt the drawing of the interleaving material 30 from spool 29. This may tend to foreshorten the first and last interleaves for a given draft. However, this is not a significant problem and may be minimized by synchronizing the clutch-brake 44 with the draft spacer control on the slicer.

The feed rolls 39, 40 are also necessarily spring biased to provide sufficient drive friction and to facilitate loading of the device. Preferably they are mounted between upright members of a subframe 52. Additionally mounted between the members of subframe 52 just beyond the feed rolls are a stationary anvil blade 54 and a cooperating rotatable blade 55 (visible in FIG. 2). The latter is mounted upon a blade shaft 56 so as to cooperate with the stationary anvil blade 54 to shear the interleaving material 30 transversely.

The blade shaft 56 is driven from the slicer apparatus in a manner to be subsequently explained. Also connected to the blade shaft is a sprocket 57 from whence a pair of pinch rolls 59, 60 are also driven. The latter are slightly offset and journaled between the upright members of subframe 52 at the extreme end thereof adjacent the slicer generally 10. The upper pinch roll 59 is forwardmost (toward the slicer 10) and has attached thereto a sprocket 61 that is driven indirectly from the blade shaft sprocket 57.

The purpose of the pinch rolls 59, 60 is to accelerate and eject each interleaf, immediately as it is severed, downwardly into the path of a slice as the latter is thrown from knife 12. It is necessary that each interleaf be ejected very quickly; and to accomplish this the pinch rolls 59, 60 should be operated at a lineal speed of approximately fifteen feet per second. Since it is only necessary that the blade shaft 56 be driven at a frequency proportional to the slicing rate, it has been found preferable to drive the pinch rolls 59, 60 which should be relatively small in diameter, at approximately a 5:1 ratio as compared to the blade shaft 56. This may be done by proper selection of intermediate gearing or drive pulleys.

The present embodiment utilizes timing belt drives and pulleys. A stanchion 62 is mounted at one side of the subframe 52. An adjustable bar 63 is secured to the stanchion by bolts 64 run through a slot therein. The latter has a bifurcated yoke 66 through which a stub shaft 67 is rotatably mounted. Both a driven sprocket 68 and a driving sprocket 69 are fixed to the stub shaft 67. One belt 70 is trained between the driven sprocket 68 and the sprocket 57 on blade shaft 56. In turn the driving sprocket 69 is connected by a belt 72 to the sprocket 61 connected to the upper pinch roll 59. An idler pulley 71 may also be provided to guide and take up slack in the belt 70.

By proper selection of sprocket sizes, the desired drive ratio between blade shaft 56 and the pinch rolls 59, 60 may be obtained.

The blade shaft 56 is driven by a connection at the side of subframe 52 opposite sprocket 57 through a pair of beveled gears 75 and drive sprocket 76 by a chain 77 extending from the output sprocket 78 of a synchronizing means, namely a correction transmission unit generally 79. The latter unit is a commercially available piece of equipment that allows for a phase or timing adjustment between the input and output thereof. A satisfactory unit performs the adjustment through a planetary drive connected between its input and output shafts. The correction is obtained by a unit motor 80 that is connected, internally, to the planetary drive. A suitable correction transmission unit is marketed under the name Machine-O-Matic, and manufactured by Machine-O-Matic, Inc. of Evanston, Ill.

An input sprocket 81 for the correction transmission unit generally 79 is, in turn, connected by a drive chain 82 with a slicer drive shaft 83 that is synchronized with the knife shaft 13.

In operation a spool 29 of interleaving material 30 is mounted upon the spool shaft 28 and the interleaving material inserted between feed rolls 39, 40, and fed between the stationary knife 54 and rotatable blade 55 to the pinch rolls 59, 60. Thereafter both the electric motor 41 and the slicer are energized briefly to cause a few interleaves to be cut. The bacon slicer is then loaded with a slab of bacon and operated to produce slices. Initially an operator must observe the resulting placement of interleaves between slices on the take-off conveyor generally 16. If they are falling too high or too deep across the width of the slices, the unit motor 80 of the correction transmission unit generally 79 is operated to adjust the phase of the interleaf blade 55 in relation to the slicer. The latter placement of interleaves on the slices will be affected a great deal by the thickness of the bacon slab, and to some lesser extent by the temperature of the bacon and the particular interleaving material utilized. It is contemplated that variations in slab thickness may be compensated automatically by correlating the correction transmission unit 79 with a feeler set in the path of the bacon slab to measure vertical dimensions just in advance of blade 12. As the slab thickness increases ejection of an interleaf is to be retarded so as to be projected a shallower distance between slices; and, conversely, as slab thickness decreases the ejection of an interleaf is advanced.

The operator may also adjust the speed of the electric motor and variable speed drive 41, if necessary, to obtain an interleaf dimension suitable for the thickness of the bacon slab being processed. Thereafter operation of the apparatus will be automatic and the electric clutch-brake unit 44 will briefly interrupt the feed of interleaving material into the blade 55 and pinch rolls 59, 60 only during interruption of the bacon slab feed which occurs periodically to separate and distinguish drafts of shingled slices on the take-off conveyor 16 and also during reloading of additional slabs on the slicer generally 10.

Means to control bacon slab feed are well known. Typical examples are disclosed in U.S. Pats. 3,142,323 and 3,015,350. The former results in a pre-selected volume (or weight) of product slices, regardless of number, for each draft; whereas the latter results in a pre-set number of slices being mechanically counted for each draft. The present invention is adaptable to these and other types of slicer controls for actuating the clutch-brake unit 44. Initiation of both slicer and interleave feed will depend upon the slicer control. However, it will be understood that where the former, volume-type control is utilized there will probably be some wastage of unnecessary interleaves cut following the last slice of a draft of product, before the interleave feed is halted. Where the latter, number, type control is employed it is possible to utilize a separate and independent counter device to actuate the clutch-brake unit 44 to halt the feed of interleave material one or two slices before a full draft of product is completed.

Obviously many modifications and variations of the invention as hereinbefore set forth may be made without departing from the spirit and scope thereof, and therefore only such limitations should be imposed as are indicated in the appended claims.

We claim:

1. An improved apparatus for slicing and interleaving material at high speed, said apparatus comprising: slicing means for severing a succession of slices from a body of product and throwing said slices in a forwardly path; cutting means for cutting successive interleaves from stock, said cutting means being located forwardly of said slicing means; and ejecting means to accelerate each interleaf along a direction aimed to contact the forward phase of a slice leaving said slicing means.

2. The apparatus of claim 1 wherein said slicing means is a rotary slicer knife rotating in a given sense; and said ejecting means is located and aimed to direct the interleaves to overlap the end side of a slice last severed from the body of material.

3. The apparatus of claim 1 wherein the cutting means is connected to be driven from said slicing means at a frequency proportional to the rate of said slicing means and the cutting means and ejecting means is located forwardly and above said slicing means so as to accelerate said interleaves downwardly.

4. The apparatus of claim 3 including a synchronizing means connected between said slicing means and said cutting means.

5. The apparatus of claim 3 wherein interleaf stock is fed to said cutting means from a substantially continuous source.

6. The apparatus of claim 4 wherein feed drive means is provided between said continuous source of interleaf stock and said cutting means to advance said stock into said cutting means at a selectable speed independent of said slicing means and said ejecting means.

7. An apparatus for interleaving bacon slices with an interleaf sheet in association with a bacon slicer having a slab feed delivering a bacon slab forwardly to a rotating knife whereby slices are successively severed from a first edge to a second edge of said slab and thrown, by the knife, forwardly to a take-off conveyor whereupon said slices are received in a shingled configuration, said apparatus comprising: a frame positioned above said take-off conveyor forwardly of said knife, said frame inclined at an angle upwardly from a point between said knife and said take-off conveyor; a shaft mounted above said frame for supporting a spool of interleaf stock; a friction brake pivotally mounted on said frame for bearing against said spool of interleaved stock; a pair of feed rolls mounted upon said frame between said shaft and said point for feeding interleaf stock from a spool on said shaft; a disengageable variable speed drive connected to at least one of said feed rolls, said drive being controlled to be automatically disengaged to halt the feeding stock when said slab feed of said slicer is halted; a stationary anvil blade mounted on said frame parallel to and beyond said feed rolls toward said slicer knife; a driven blade rotatable on a transverse axis parallel and in cooperation with said anvil blade to cut interleaves from said stock fed from said feed rolls, said driven blade being connected to said slicer knife drive so as to be rotatable at a frequency proportional to the rate of rotation of said slicer blade; and a pair of ejector pinch rolls beyond said driven blade positioned to receive each interleaf severed thereby, said ejector rolls being driven at a speed greater than the lineal speed of said driven blade whereby each interleaf will be accelerated into the path of slices leaving said slicer knife.

References Cited

UNITED STATES PATENTS

| 2,813,798 | 11/1957 | Toby. | |
| 3,019,578 | 2/1962 | Cohen | 53—123 |
| 3,026,657 | 3/1962 | Williams et al. | 53—23 |
| 3,129,546 | 4/1964 | Redmond | 53—123 X |
| 2,877,120 | 3/1959 | Bush | 99—174 X |

W. GRAYDON ABERCROMBIE, Primary Examiner

US. Cl. X.R.

99—174; 146—94